United States Patent [19]
Danielson et al.

[11] Patent Number: 5,360,186
[45] Date of Patent: Nov. 1, 1994

[54] INFLATABLE SLIDE RAFT ASSEMBLY

[75] Inventors: Libert K. Danielson, Scottsdale; Ray McBurnett, Phoenix, both of Ariz.

[73] Assignee: The B. F. Goodrich Company, Akron, Ohio

[21] Appl. No.: 99,012

[22] Filed: Jul. 26, 1993

[51] Int. Cl.⁵ .............................................. B64D 25/14
[52] U.S. Cl. .................. 244/137.2; 244/905; 193/25 B
[58] Field of Search ............. 244/905, 137.2; 193/25 B; 441/39, 40, 41; 182/48

[56] References Cited

U.S. PATENT DOCUMENTS

| | | | |
|---|---|---|---|
| 3,463,266 | 8/1969 | Day | 182/48 |
| 3,712,417 | 1/1973 | Chacko et al. | 244/905 |
| 3,811,524 | 5/1974 | Fisher | 244/905 |
| 3,827,094 | 8/1974 | Fisher | 441/38 |
| 3,845,920 | 11/1974 | Satterfield et al. | 182/48 |
| 3,866,734 | 2/1975 | Elkins et al. | 244/905 |
| 4,013,247 | 3/1977 | Griffin | 244/137.2 |
| 4,441,582 | 4/1984 | Ward, Jr. | 244/137.2 |
| 4,519,782 | 5/1985 | Fisher | 441/40 |

FOREIGN PATENT DOCUMENTS

| | | | |
|---|---|---|---|
| 1206936 | 9/1970 | United Kingdom | 244/905 |
| 1538084 | 1/1979 | United Kingdom | 244/137.2 |

*Primary Examiner*—Michael S. Huppert
*Assistant Examiner*—Anne E. Bidwell
*Attorney, Agent, or Firm*—Joseph Januszkiewicz

[57] ABSTRACT

An aircraft life raft escape slide assembly for evacuating passengers from an aircraft and thereafter for providing a floating support when the evacuation is over water. Such assembly has an inflatable slide structure releasably connected to an inflatable boarding slide structure to define an integral unit but each structure being independently inflatable. The slide structure is inflated and deployed to operate as a slide and upon release of the inflatable slide structure from the aircraft and upon deployment of the boarding slide as a chute or slide, the inflatable slide structure operates as a raft.

14 Claims, 6 Drawing Sheets

INFLATABLE SLIDE RAFT ASSEMBLY

BACKGROUND OF THE INVENTION

This invention relates in general to an aircraft escape slide raft apparatus and more particularly to an inflatable slide raft assembly that can be used both as a slide for land evacuation of passengers and can also be used as a slide raft for water evacuation of passengers.

In the event an aircraft lands under emergency conditions on land or sea as forced landings or "ditched" at sea, escape apparatus must be provided so that the passenger and crew evacuation can be done safely in as quick a time as possible. The present invention is directed to a new and novel slide raft assembly that facilitates its quick deployment and use as either an escape slide on land where there is a considerable height requirement as from an aircraft that has more than one passenger deck or where such type of aircraft is ditched in water. In the last condition of use where the slide raft assembly is deployed from the upper deck, the slide raft cannot be loaded over its entire length because a portion of it is so high off the water and must be used as a slide which means a portion of its length cannot be used as raft capacity. This condition would result in the need to carry supplemental rafts to make up for the difference in capacity. The present invention solves this problem in this condition of deployment by providing an integral boarding slide that permits release of the entire slide raft for use as a raft and of itself permits the rapid evacuation from the airplane onto the entire length of the raft.

SUMMARY OF THE INVENTION

An aircraft life raft escape slide assembly for use in evacuating passengers and crew members from an aircraft over land or water, wherein such assembly has interconnected a first inflatable tubular structure and a second independently inflatable tubular structure. The first and second structures each have a head end and a toe end, with the respective head ends releasably connected to the aircraft adjacent to an egress door on such aircraft. The head end of the first inflatable tubular structure is releasably connected to the toe end of the second inflatable tubular structure. The first inflatable tubular structure and the second inflatable tubular structure each have independent inflation means so that the first inflatable structure can be inflated to define an evacuation slide or said first and second inflatable structures can both be inflated to present such first inflatable tubular structure as a raft and said second inflatable tubular structure as a slide to evacuate passengers onto said deployed raft.

DETAILED DESCRIPTION

Figure 1:
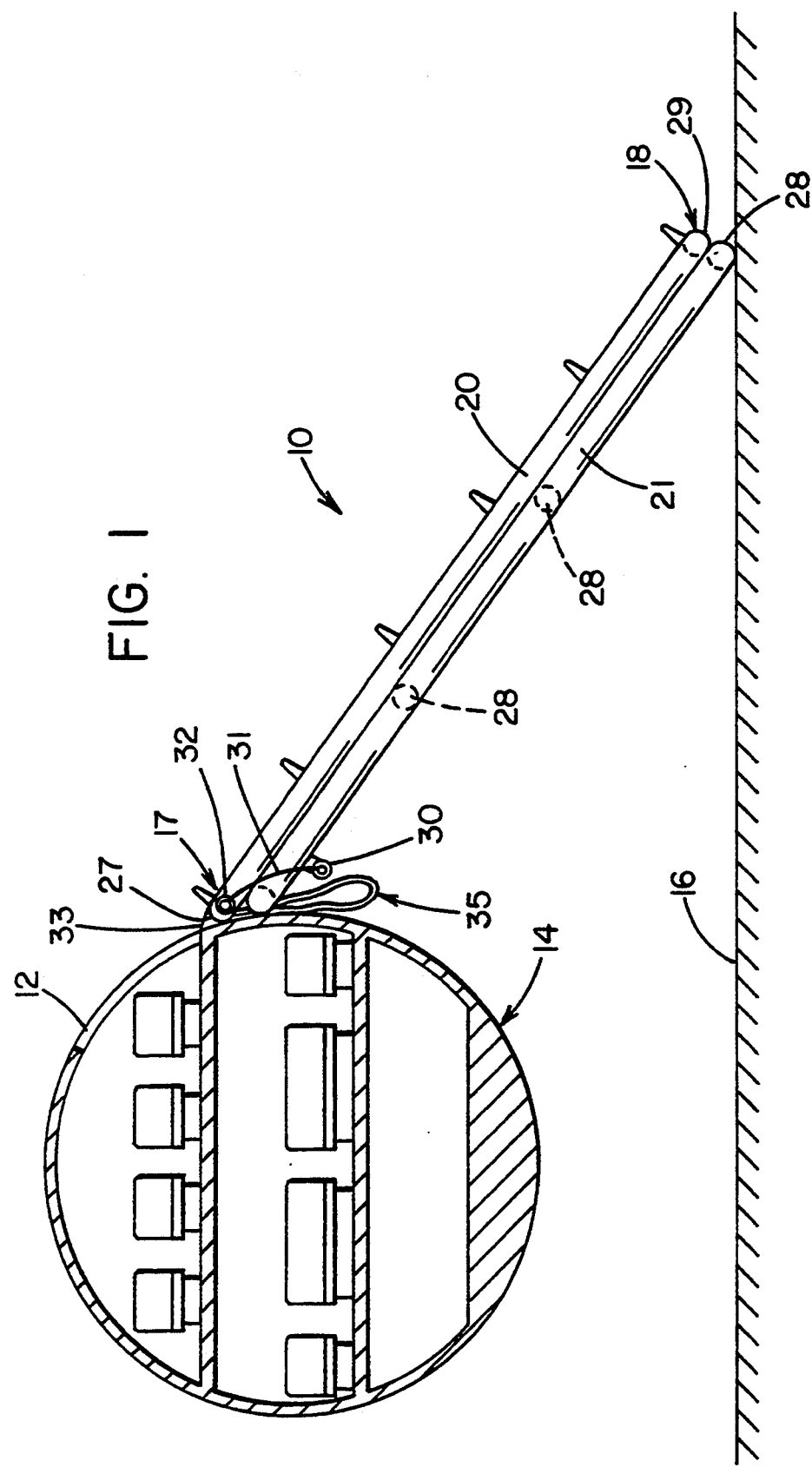
FIG. 1 is side elevational view of an inflatable life raft escape slide assembly in accordance with the present invention in a deployed condition for use with an aircraft in a position on land.

Referring now to the drawings, wherein like reference numerals designate like or corresponding parts throughout the several views, there is shown in FIG. 1 an inflatable life raft escape slide 10 deployed between an upper deck egress door 12 of an aircraft 14 and the surface of the ground 16. The life raft escape slide 10 is a conventional slide that is deployed through the egress door 12 during a period of onground emergency to provide for the rapid evacuation of passengers and crew members.

The life raft escape slide 10 includes a head end 17 and a toe end 18. The entire life raft escape slide is fabricated from a fabric or other suitable material coated with an elastomer. The various parts are joined together with a suitable adhesive whereby the composite structure will preclude air flow from the various chambers during operation in the inflated state including its use as a raft in and around water. The life raft escape slide 10 is of a multi-tubular construction having a pair of longitudinally extending tubes 20 and 21 on the one side and a pair of longitudinally extending tubes 22 and 23 on the other side parallel to each other. Located between parallel tubes 20 and 22 is a center divider collision prevention tube 25 (FIGS. 4 & 5) extending parallel to tubes 20, 21, 22 and 23. The divider tube 25 as seen in FIG. 5 will expand upwardly into the slide path to prevent evacuees on the opposite sides of the axes of the slide tube from colliding as they depart from the aircraft.

The life raft escape slide 10 has the respective tubes 20-21 and 22-23 fastened together throughout their lengths by a suitable bonding means along their common abutment surfaces and by a slide cover 26 (FIG. 5), also on each side of the slide. As seen in FIG. 5 the relatively slippery surface material of the slide cover 26 is fastened to the center divider tube 25 and between the respective tubes 20-21 and 22-23. In the deployment of the life raft escape slide as a raft, the passengers leaving the aircraft will be seated on this slide cover 26.

Figure 4:
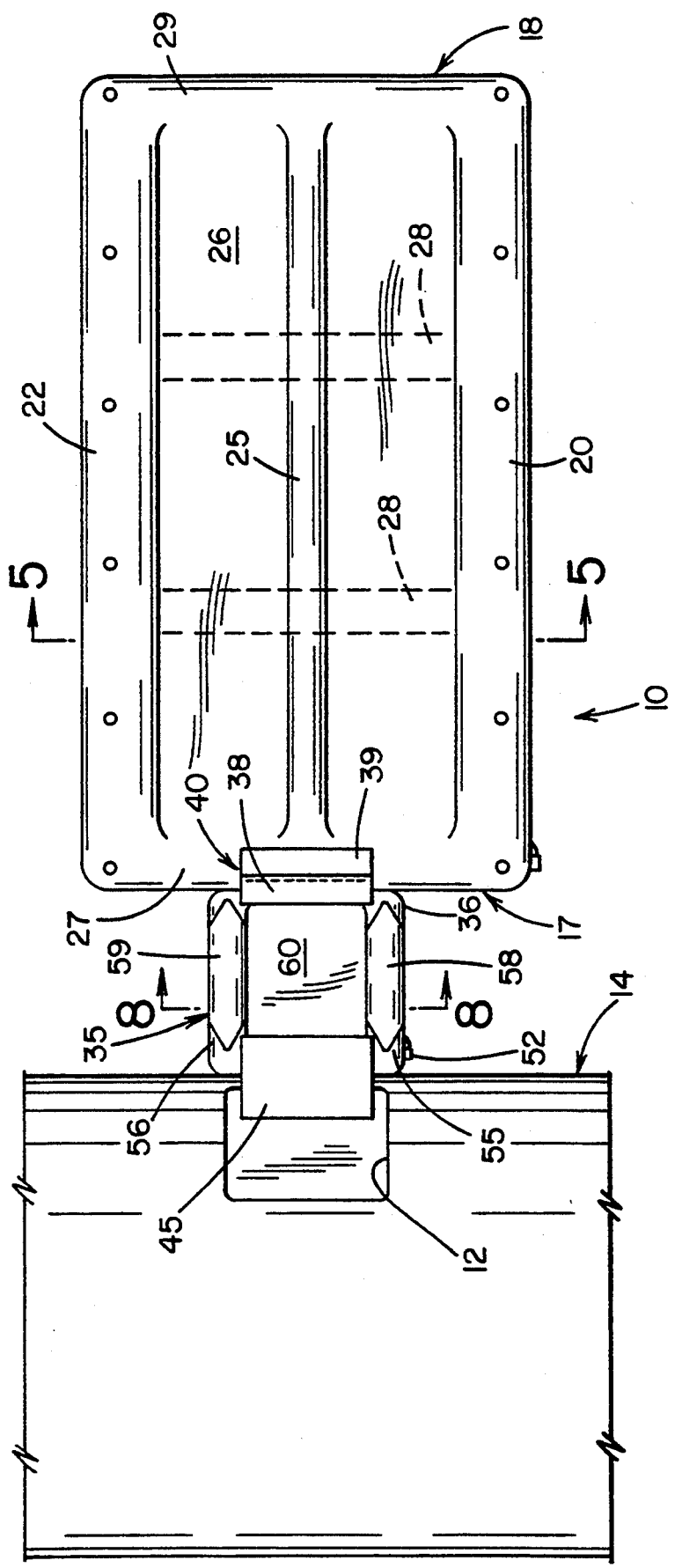
FIG. 4 is a plan view of the life raft escape slide assembly fully deployed as depicted by FIG. 3.
Figure 5:
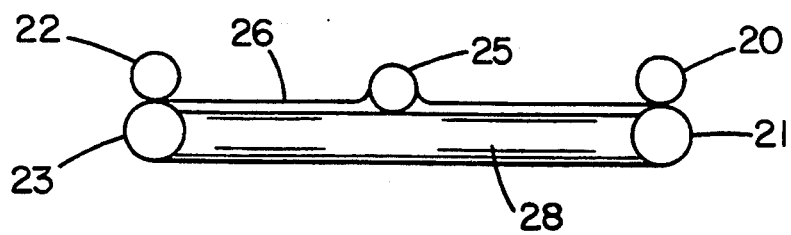
FIG. 5 is a cross sectional view of the life raft escape slide taken on line 5—5 of FIG. 4.
Figure 6:
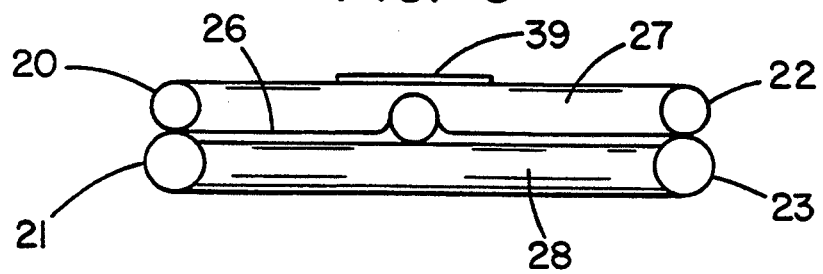
FIG. 6 is a cross sectional view of the life raft slide taken on line 6—6 of FIG. 3.

As shown in FIGS. 4 & 5 the lower tubes 21 and 23 are interconnected by cross support tubes 28, which cross tubes upon inflation maintain the inflated life raft escape slide in a deployed or extended condition for use as a slide or a raft. Cross tubes 27 and 29 at the head end 17 and the toe end 18 (FIGS. 6 & 7) assure a tube configuration to use the escape slide as a raft. A suitable source of pressurized gas or air, such as a container or bottle of compressed gas 30, is mounted on the underside of slide 10, which bottle 30 is connected via a conduit 31 to an aspirator 32 located on the upper side portion of tube 20. Additional containers of compressed gas and aspirators and hoses or any combination of them may be used. The container of compressed gas 30 may also be mounted in the aircraft to make the weight of the life raft escape slide lighter in weight to facilitate its use as a raft. Suitable valve means on conduit 31 controls the pressurization of the inflatable tubes as via a lanyard or automatically upon suitable controls by a crew member for deployment from the egress door 12.

Figure 2:
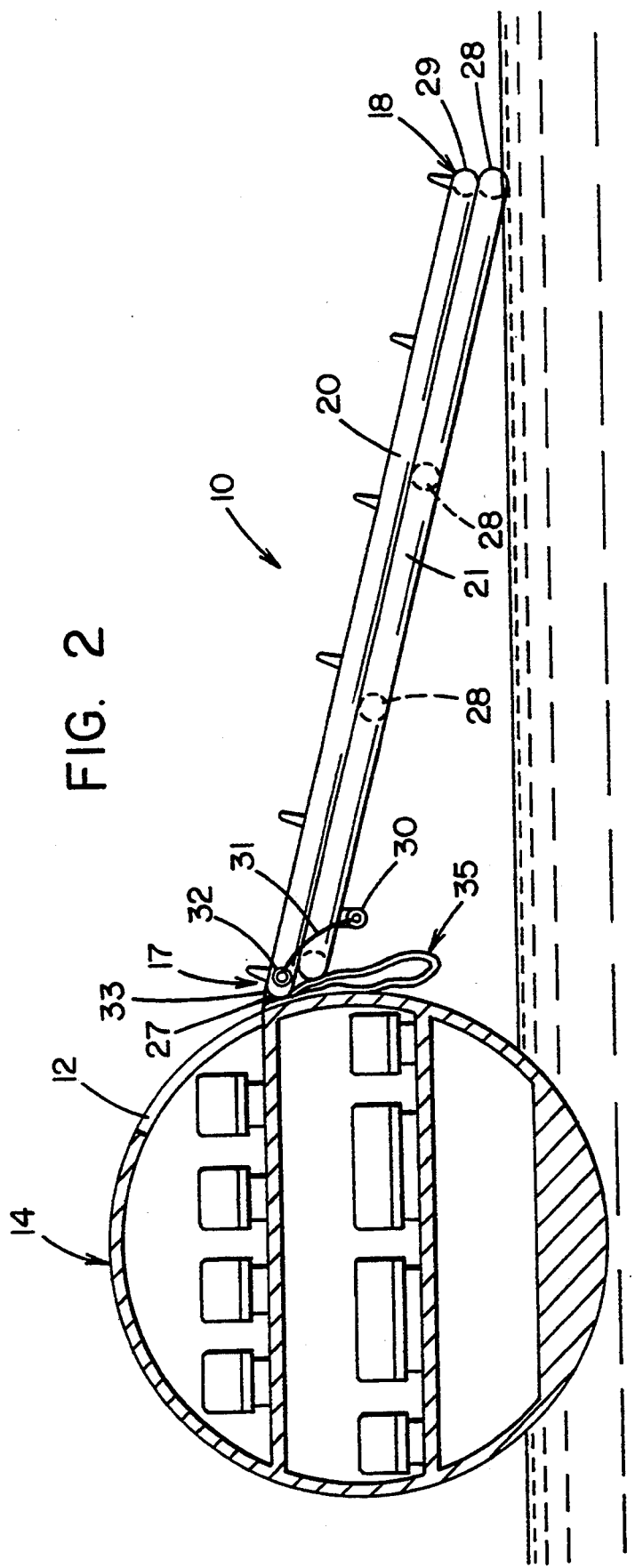
FIG. 2 is a side elevational view of an inflatable life raft escape slide assembly on a aircraft floating in water with only the life raft escape slide deployed.

The life raft escape slide 10 has the head end 17 disposed adjacent to the bottom of the egress door 12 and is securely fastened thereat as by means of a girt 33. The attachment of the girt to the head end of the slide 10 and to the aircraft structure is well-known in the art and forms no part of the invention, hence the attachment means is not shown or further described herein. Also attached to the aircraft below or underneath the life raft girt 33 is a boarding slide 35 that does not automatically inflate when the egress door 12 is opened but remains in a deflated condition (FIGS. 1 & 2). The toe end 36 of the boarding slide 35 is suitably releasably attached to the head end 17 of the life raft slide 10 as by panels 38 and 39 respectively. Panel 38 is suitably bonded to the boarding slide 35 while panel 39 is suitably bonded to the head end of slide 10.

Figure 7:
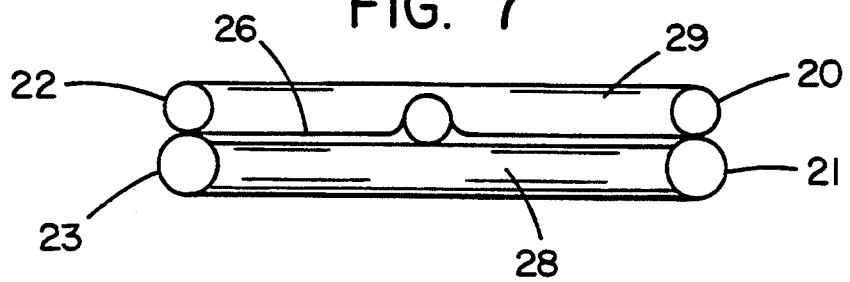
FIG. 7 is a cross sectional view of the life raft escape slide taken on line 7—7 of FIG. 3.
Figure 8:
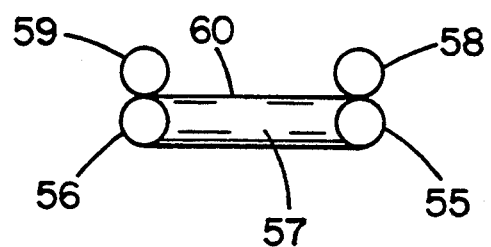
FIG. 8 is a cross sectional view of the boarding slide taken on line 8—8 of FIG. 4.
Figure 9:
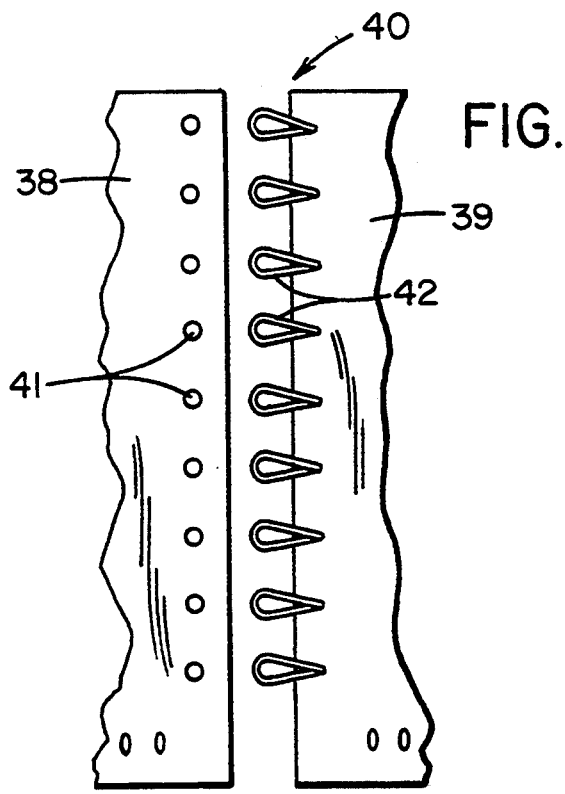
FIG. 9 is a plan view of the forward portions of the connecting panels for use on the head and toe end portions of the life raft escape slide and boarding slide of the life raft escape slide assembly.
Figure 10:
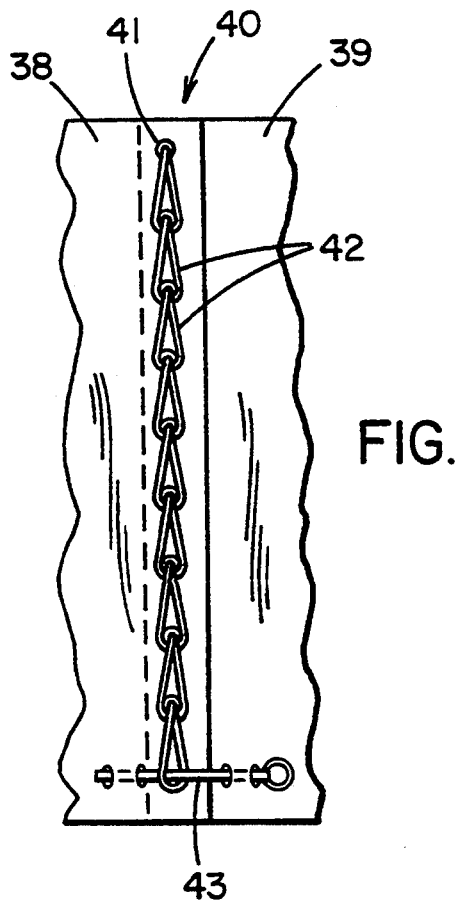
FIG. 10 is a plan view of the connecting panels interconnecting the boarding slide to the life raft escape slide.
Figure 11:
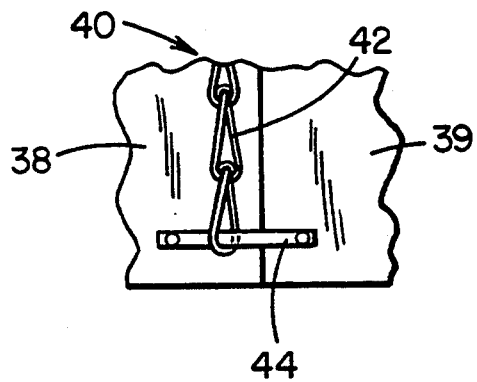
FIG. 11 is a enlarged fragmentary plan view of a modified form of release means for use on the head end portion of the life raft escape slide.

Although the specific releasable attaching means 40 (FIG. 9) is not part of the invention a brief description follows of one fastening means as any suitable release means may be employed. Panel 38 has a plurality of apertures 41 which if desired may be provided with grommets. Panel 39 has a plurality fabric loops 42 suitably fastened to the end thereof that is adjacent to panel 38. The end of panel 38 is positioned over panel 39 and the loops 42 are passed through the adjacent apertures 41 in panel 38. One outboard loop is then threaded over the adjacent loop, which is then threaded over the loop adjacent to it, etc. Working inwardly from one side to the other side, when the final loop is reached a suitable pin 43 shown in FIG. 10 or a tab 44 (as a modification of pin 43) attached to grommets may be passed there through to lock all the loops together and firmly fasten the boarding slide 35 to the life raft escape slide 10. The head end of the boarding ramp 35 is fastened within the aircraft 14 by means of a girt or girt means 45, one end of which is secured to the head end of the boarding slide 35 and the other end is secured to the structure of the egress doorway. The release means described may also be used for attaching the head end 17 of the life raft escape slide 10 to the door sill of the aircraft. The attachment of the girts to aircraft doors or egress openings on aircrafts is well known in the art and forms no part of the invention, hence the attachment means is not shown or further described. Releasable attaching means is shown in FIGS. 7 and 8 of U.S. Pat. No. 3,712,417 or, as tabs in British Patent 1,206,936.

In the case of a water evacuation, the life raft escape slide 10 is released from the aircraft by manually operating a release mechanism (such as that described above) from the aircraft 14 as is old and well known in the art and forms no part of this invention. As the slide raft 10 falls away from the aircraft 14, the inflation system of this boarding slide is activated. A container or bottle of compressed gas 50 (FIG. 3) is mounted on the underside of boarding slide 35, which bottle 50 is connected via a conduit 51 to an aspirator 52 located on the side portion of the boarding slide 35.

Figure 3:
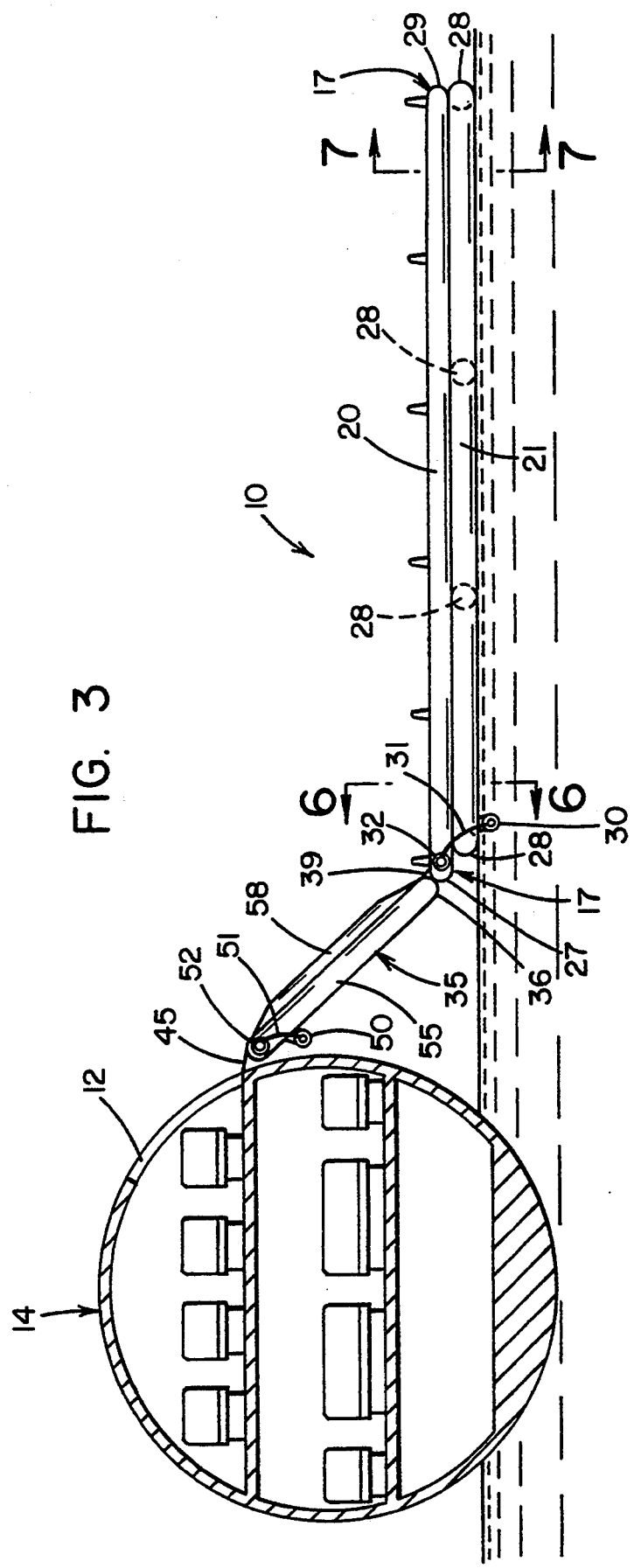
FIG. 3 is a view like FIG. 2 but showing the assembly with the boarding slide deployed for use and the life raft escape slide deployed as a raft.

The boarding slide 35 is shown (FIG. 3) in a position for evacuating passengers from the aircraft 14 with the fuselage of the aircraft partially submerged in the water after the aircraft has been ditched. As shown in FIG. 3, the escape slide raft 10 is fully deployed in the water while the boarding slide 35 is positioned at a suitable angle of approximately 40° to the horizontal. With this arrangement, the entire length of the life raft escape slide 10 may be used by the evacuees as compared to a limited portion in the case where no boarding slide 35 is available. In addition, the shorter length boarding slide facilitates the rapid egress of evacuees from the aircraft. The boarding slide 35 and the life raft escape slide 10 form an inflatable life raft escape slide assembly as an integral unit.

The boarding slide 35 is a multi-tubular construction having a pair of laterally spaced, longitudinally extending inflatable tube members 55 and 56 interconnected by laterally extending tube members 57 (only one shown in FIG. 8). Each tube member 55 and 56 has a longitudinally extending tube member 58 and 59 respectively bonded thereto to provide a railing for the confinement of passengers as they slide down the boarding slide. The boarding slide 35 has a slide panel member 60 extending across the full length of the boarding slide and is bonded to the respective tube members 55 and 56. The boarding slide's tube members are fabricated from an air impervious material such as a rubber coated material so that it cooperates with the respective tube members 58 and 59 to provide a slide that is generally rectangular in plan view. As described above the boarding slide 35 and the life raft slide 10 form an integral life raft escape slide assembly.

Upon completion of the boarding process from the aircraft to the life raft escape slide 10 via the boarding slide 35 the raft slide 10 is disconnected from the boarding slide by pulling pin 43 which frees the loops to unthread themselves with panels 38 & 39 quickly separating. The tab 44 which has opposite ends secured to panels 38 and 39 by the provision of press stud elements similarly can release the fabric loops to separate panels 38 and 39.

It should be understood of course, that the foregoing disclosure relates to only a preferred embodiment of the invention and that numerous modifications or alterations may be made therein without departing from the spirit and the scope of the invention as set forth in the appended claims.

We claim:

1. An aircraft life raft escape slide assembly for use from an egress door of an aircraft comprising an assembly of at lest two inflatable side tubes and two inflatable transverse tubes which join the ends of said side tubes arranged to hold said side tubes in spaced relationship when all of said tubes are inflated, a strip of flexible material secured to said tubes to define a life raft slide extending in a longitudinal direction when said tubes are inflated, said life raft slide having a head end and a toe end, girt means releasably connects said head end of said life raft slide to said aircraft adjacent to said egress door, a first pressurized means mounted on said life raft slide operative upon actuation to inflate all of said tubes, an inflatable boarding slide having a head end and a toe end, said head end of said boarding slide releasably connected to said aircraft adjacent to said egress door, said toe end of said boarding slide releasably connected to said head end of said life raft slide, and a second pressurized means operative upon actuation to pressurize said inflatable boarding slide to deploy said boarding slide as a slide and to deploy said life raft into a horizontal position for use as a raft while still connected to said boarding slide.

2. In an aircraft life raft escape slide assembly as set forth in claim 1 wherein said toe end of said boarding slide has release means for interconnecting said head end of said life raft slide to said toe end of said boarding slide and is operative upon actuation to release said life raft slide from said boarding slide.

3. In an aircraft life raft escape slide assembly as set forth in claim 2 wherein the overall length of said boarding slide is less then one-half the length of said life raft slide.

4. In an aircraft life raft escape slide assembly as set forth in claim 3 wherein said release means between said head end of said life raft slide and said toe end of said boarding slide is a quick release means.

5. In an aircraft life raft escape slide assembly as set forth in claim 4 wherein said life raft slide has at least two separate longitudinally extending slide paths for the simultaneous passage of evacuees.

6. An aircraft life raft escape slide assembly for use from an egress door of an aircraft comprising a first inflatable structure in the inflated condition having a head end and toe end, a second inflatable structure having a head end and a toe end, each of said head ends secured to said aircraft adjacent to said egress door upon deployment of said first inflatable structure from said egress door, said toe end of said second inflatable structure having a releasably secured connection to said head end of said first inlatable structure, pressurized means connected to said life raft escape slide assembly to selectively pressurize said first inflatable structure and said second inflatable structure wherein said first structure is deployed as slide/raft while said second inflatable structure is deployed as an inclined slide for said first structure when said first structure is deployed as a raft.

7. An aircraft life raft escape slide assembly as set forth in claim 6 wherein said first inflatable structure has a plurality of tubes with a slide support surface that is configured upon inflation to define either a depending aircraft escape slide or a horizontally disposed life raft when said second inflatable structure is inflated and deployed as a depending slide support surface.

8. An aircraft life raft escape slide assembly as set forth in claim 7 wherein said releasably secured connection between said toe end of said second inflatable structure and said head end of said first inflatable structure is a quick release means.

9. An aircraft life raft escape slide assembly as set forth in claim 8 wherein said pressurized means comprises a first pressurized means and a second pressurized means, said first pressurized means is mounted on said first inflatable structure, and said second pressurized means is mounted on said second inflatable structure.

10. An emergency aircraft escape slide raft for use on land and water comprising a first inflatable tube structure extendable in an inflated condition from an emergency egress opening in an aircraft to a position having a portion thereof adjacent the land or water, a slide surface located on said inflatable tube structure and integral therewith along the full length that provides a support surface on which persons may slide when evacuating from an aircraft or on which persons may sit when said first inflatable tube structure is deployed in a horizontal condition as a raft, first inflation means operably connected to said first inflatable tube structure to provide for an inflation thereof into a slide when an emergency escape from the aircraft is to be provided, said first inflatable tube structure having a head end and a toe end, said head end having release means attached to said aircraft adjacent to said egress opening to free said first inflatable tube structure from said aircraft, a second inflatable tube structure having one end releasably secured to said head end of said first inflatable tube structure and the other end secured to said aircraft adjacent to said egress opening, second inflation means operably connected to said second inflatable tube structure, said second inflation means is operative upon actuation to pressurize said second inflatable tube structure to deploy said first inflatable structure as a horizontally extending raft and to deploy said second tube structure as a depending boarding slide relative to said aircraft for evacuating people onto said first inflatable structure that is deployed as a raft, and release means interconnecting said head end of said first tube structure to said one end of said second tube structure and operative upon actuation to release said first tube structure from said second tube structure.

11. An emergency aircraft escape slide raft as set forth in claim 10 wherein said means connected to said first inflatable structure to provide for inflation thereof is located within aid aircraft to minimize the weight of said first inflatable structure.

12. An aircraft life raft escape slide assembly for use from an egress opening in an aircraft, said slide assembly having a first set of inflatable members and a second set of inflatable members, said slide assembly operative upon actuation to deploy said two sets of members into either a first deployed condition or a second deployed condition, each set of inflatable members have a head end and a toe end, said inflatable members in said first deployed condition are configured to define solely an inclined escape slide, said inflatable members in said second deployed condition are configured to define an inclined slide member connected to a horizontally disposed life raft, and release means interconnecting said inclined slide member to said horizontally disposed life raft to separate said horizontally disposed life raft from said inclined slide member.

13. An aircraft life raft escape slide assembly as set forth in claim 12 wherein said first set of inflatable members define said inclined escape slide in said first deployed condition, and said first set of inflatable members define said horizontally disposed life raft in said second deployed condition.

14. An aircraft life raft escape slide assembly as set forth in claim 13 wherein said first set of inflatable members are the only members inflated in the first deployed condition, and said first set of inflatable members and said second set of inflatable members are both deployed in said second deployed condition.

* * * * *